United States Patent [19]

Johnson, Jr.

[11] 4,289,511

[45] Sep. 15, 1981

[54] BAG-TYPE FILTER APPARATUS WITH VENTURI-SUPPORTED AIR DIFFUSER

[76] Inventor: Allen S. Johnson, Jr., P.O. Drawer 1037, Salisbury, N.C. 28144

[21] Appl. No.: 171,350

[22] Filed: Jul. 23, 1980

Related U.S. Application Data

[63] Continuation-in-part of Ser. No. 76,605, Sep. 18, 1979, Pat. No. 4,231,770.

[51] Int. Cl.³ .............................................. B01D 46/04
[52] U.S. Cl. .................................. 55/302; 55/341 R; 55/379
[58] Field of Search ...................... 55/302, 341 R, 379

[56] References Cited

U.S. PATENT DOCUMENTS

| | | | |
|---|---|---|---|
| 2,828,017 | 3/1958 | Ronningen et al. | 55/303 X |
| 3,594,992 | 7/1971 | Carr et al. | 55/302 |
| 4,097,255 | 6/1978 | Samolis | 55/302 X |
| 4,231,770 | 11/1980 | Johnson, Jr. | 55/302 |

FOREIGN PATENT DOCUMENTS

| | | | |
|---|---|---|---|
| 453176 | 1/1975 | U.S.S.R. | 55/302 |
| 443674 | 4/1975 | U.S.S.R. | 55/302 |

*Primary Examiner*—Kathleen J. Prunner
*Attorney, Agent, or Firm*—Bell, Seltzer, Park & Gibson

[57] ABSTRACT

The invention is directed to the more effective cleaning of filter bags in a filter apparatus of the type having tubular venturis extending into the outlet ends of tubular supporting cages for the respective filter bags. Generally, such filter bags are cleaned by a periodic reverse flow of a jet of air into each venturi and thus through the filter bag. To enhance the cleaning of each filter bag, the present invention provides a hollow, perforated air diffuser tube communicatively connected to, supported by and extending from each venturi and longitudinally within the respective tubular cage and its surrounding filter bag so that, when a reverse flow of a jet of air is directed into the filter bag via the venturi, the diffuser tube diffuses and distributes the air throughout the filter bag so as to dislodge filtered particles along the length of the filter bag.

14 Claims, 6 Drawing Figures

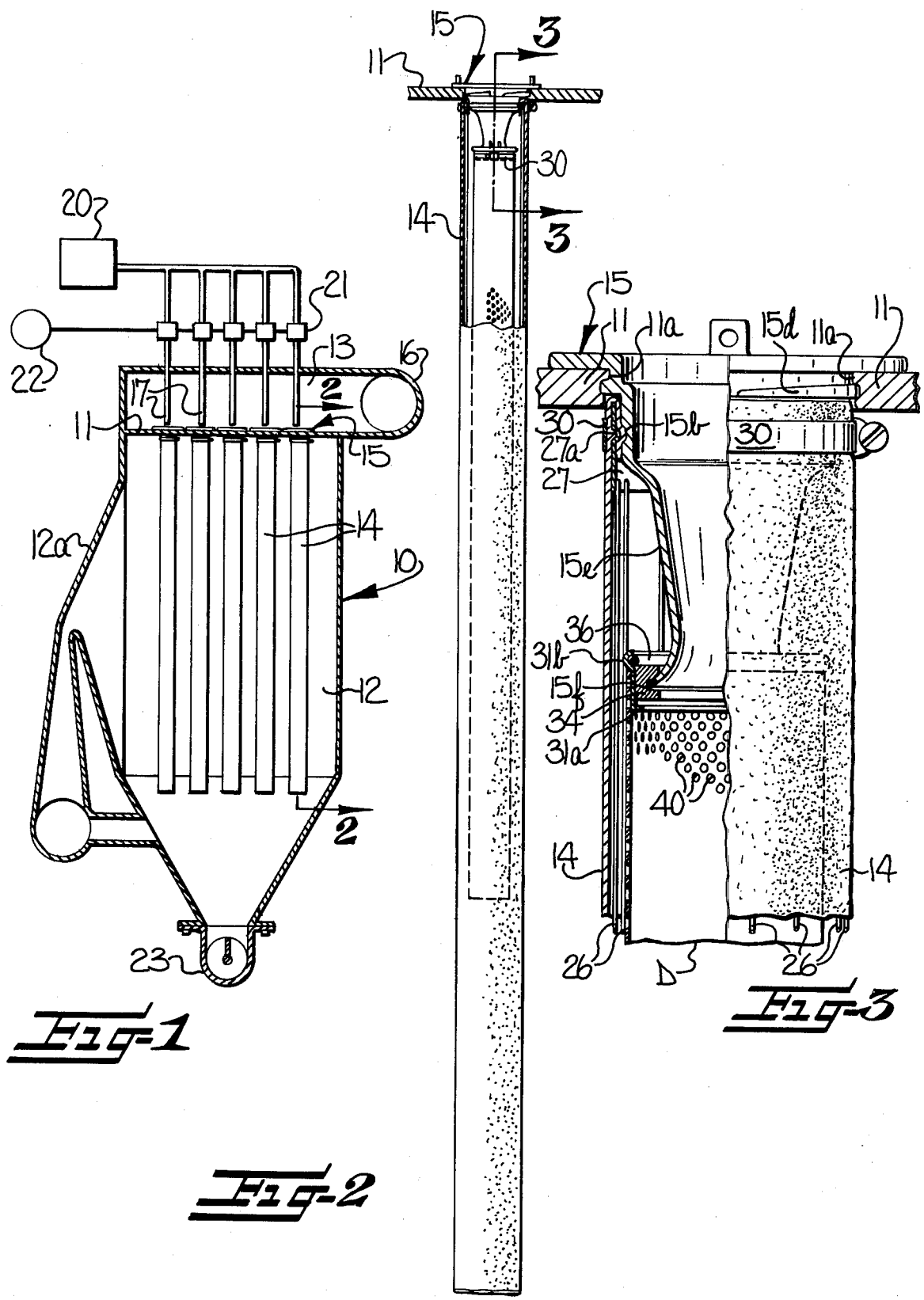

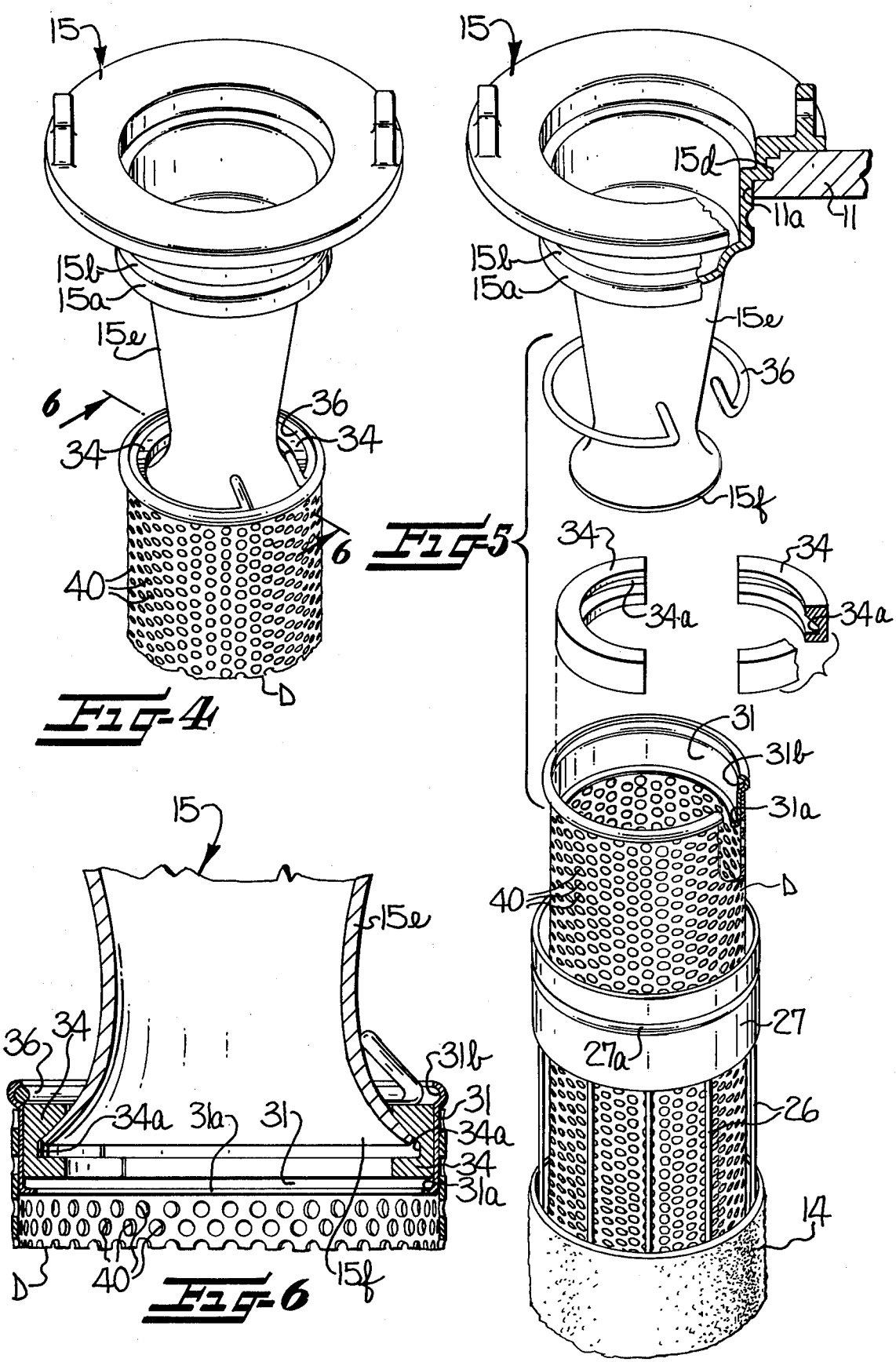

BAG-TYPE FILTER APPARATUS WITH VENTURI-SUPPORTED AIR DIFFUSER

CROSS-REFERENCE TO RELATED APPLICATION

This application is a continuation-in-part of copending application Ser. No. 06/076,605, now U.S. Pat. No. 4,231,770, filed Sept. 18, 1979, and entitled BAG-TYPE FILTER APPARATUS WITH INTERNAL AIR DIFFUSER.

BACKGROUND AND SUMMARY OF THE INVENTION

This invention relates to filter apparatus of the type having elongate, tubular fabric filter bags for filtering and collecting particulate material on the exterior thereof and which are cleaned periodically by a reverse flow of air therethrough. In some instances, such reverse flow of air enters the the filter bags by way of a plenum common to a respective group of the filter bags. In other instances, a so-called "pulse jet" technique of cleaning the filter bags has been employed in which high energy jets of reverse flowing air are directed into and through tubular venturis and thence through respective filter bags so that the reverse air flow expands suddenly upon entering the filter bags for shaking the same to aid in dislodging the collected particulate material therefrom.

While the pulse jet technique may have improved the cleaning of the filter bags to some degree, it has been found that much improved results have been achieved in the cleaning of such filter bags by combining an air diffuser, as set forth in my said copending application, with the aforementioned pulse jet cleaning technique. Accordingly, it is a primary object of this invention to provide a filter apparatus of the type described wherein an air diffuser tube generally of the type set forth in said copending application is combined with each venturi tube within the respective cage and filter bag.

It is a more specific object to provide a bag-type filter apparatus with a hollow perforate open-ended air diffuser means or perforated tube which is communicatively connected to, supported by and extends from a tubular venturi and within a tubular cage on which each respective tubular filter bag is supported, and wherein the air diffuser means or tube is thus positioned in each cage for receiving a reverse flowing high energy jet of air via the respective venturi for diffusing and distributing the air throughout the filter bag when a periodic reverse flow of a jet of air is directed into the respective filter bag so as to more effectively clean the filter bag while also reducing excessive flexing of the filter bag and abrasive wear thereof to thereby provide a substantial increase in the efficiency of the filter apparatus and a significant increase in the life of the filter bag.

BRIEF DESCRIPTION OF THE DRAWINGS

Some of the features and advantages of the invention having been stated, others will become apparent as the description proceeds when taken in connection with the accompanying drawings in which FIG. 1 is a cross-sectional view of a filtering apparatus of the type employing a plurality of bag-type tubular filters;

FIG. 2 is a side view of the various components of a bag-type filter assembly, and showing the filter bag, its supporting cage, a venturi extending within the upper end portion of the cage, and the hollow diffuser tube of the present invention;

FIG. 3 is an enlarged longitudinal sectional view, with parts broken away, illustrating various components of the filter assembly in assembled relation;

FIG. 4 is a fragmentary perspective view of the venturi and one end portion of the air diffuser tube connected thereto;

FIG. 5 is a partially exploded view of the components of the filter assembly of FIG. 4 along with an associated outlet end portion of a filter bag; and FIG. 6 is an enlarged, fragmentary sectional view taken substantially along line 6—6 in FIG. 4.

DESCRIPTION OF THE ILLUSTRATED EMBODIMENT

Referring now more particularly to the drawings, FIG. 1 illustrates a conventional filtering apparatus of the type utilizing elongate baglike tubular filters. The filtering apparatus includes a filter housing 10, commonly referred to as a "baghouse," which is divided by a horizontal wall 11 into a lower filtering chamber 12 and an upper filtered air plenum 13. A plurality of elongate hollow tubular filter bags, indicated by the reference character 14, are mounted in the filtering chamber 12 in a generally vertical orientation with the upper ends thereof supportingly carried by the horizontal dividing wall 11. The upper ends of the respective filter bags 14 communicate with the filtered air plenum 13 via respective tubular venturis 15 seated in suitable holes 11a provided in the wall 11.

An inlet duct 12a directs particulate-laden gas into the filtering chamber 12, where it passes around the respective filter bags 14 and then flows through the gas permeable filter bags while the particulate material is filtered and retained on the exterior surface of the filter bags. After passing into the hollow interior of the filter bags 14, the filtered gas passes upwardly through the outlet ends of the respective filter bags 14 and the venturis 15 and into the filtered air chamber 13. From there, the filtered gas is directed to and through an outlet duct 16.

As the particulate material builds up on the exterior surface of the filter bags 14, it becomes necessary to clean the filter bags and dislodge the accumulated particulate material therefrom. This is accomplished by periodically directing a purging flow of air through the filter bags in a reverse direction. In the illustrated filtering apparatus, a "jet pulse" technique is used for cleaning the filter bags, wherein high energy pulses or jets of compressed air or gas periodically flow through jet nozzles 17 into the open upper ends or mouths of the respective tubular venturis 15 in a reverse direction and thus flow into the outlet ends of and through the respective filter bags 14. As shown, compressed air is directed to the nozzles 17 from a compressed air source 20 and through respective control valves 21 which are normally closed and are momentarily opened periodically by a suitable control means 22, as is conventional. The particulate material dislodged from the filter bags 14 by the reverse flowing jets of air is accumulated in the lower region of the filter housing 10 and is removed by a screw conveyor 23.

FIG. 2 illustrates the various components of a filter assembly which is generally similar to the filter assembly disclosed in said copending application, but is particularly adapted for use with the tubular venturi, as will be presently explained. Accordingly, each elongate tubular filter bag 14 is made of a gas permeable fabric and in a form somewhat similar to a sock, having one open end and one closed end. The filter assembly also includes an elongate tubular supporting frame 26, commonly termed a "cage." The supporting frame or cage 26 is of openwork construction for readily allowing the flow of air therethrough, and is typically formed of heavy wire.

The supporting frame or cage 26 has an axially extending rim or sleeve 27 at the upper end thereof for securing the cage to an enlarged upper hub portion 15a of the respective tubular venturi 15. The lower end of the cage 26 may be closed by an end plate, not shown. The cage 26 is adapted to be positioned inside the tubular filter bag 14 so as to support the filter bag in an open tubular configuration and prevent it from collapsing upon itself during the filtering operation as the particulate-laden gas passes inwardly therethrough. Accordingly, it will be observed in FIG. 3 that the open end of the filter bag 14 is folded over the rim or sleeve 27, and the sleeve 27 has an inwardly projecting bead 27a therearound which registers with an annular groove 15b in hub portion 15a of venturi 15 to press the overfolded end of the filter bag 14 into the groove 15b for obtaining an effective airtight connection between the outlet end of the filter bag 14 and the upper portion of the venturi 15 when the sleeve has been slid over the hub portion 15a of venturi 15. The filter bag 14 is also retained on sleeve 27 by a suitable clamp means 30 also serving to clampingly secure sleeve 27 on the venturi hub portion 15a. The flanged upper end 15d of venturi 15, above hub portion 15a, has a shoulder portion 15d thereon which may be threaded into or otherwise secured in the respective opening 11a through the housing horizontal wall 11, there being one of the openings 11a provided in wall 11 for each filter assembly.

The venturi 15 also includes an elongate, tapered, tubular medial portion 15e extending downwardly from and communicating with hub portion 15a and defining the venturi body. The venturi body 15e is of substantially smaller diameter at its lower or inner end than at its upper end, and its lower end terminates in an outwardly flared annular ridge portion 15f (FIGS. 3, 5, and 6) spaced inwardly from cage 26 and the filter bag 14 thereover and also spaced a substantial distance downwardly from the outlet end of and within the filter bag 14. It can be seen in FIGS. 3 and 6 that the outwardly flared annular ridge portion 15f of venturi 15 has an upwardly and inwardly inclined surface thereon which serves as a supporting surface for communicatively connecting an improved hollow open-ended air diffuser means thereto substantially in axial alignment with the venturi.

According to the present invention, the air diffuser means is provided in combination with the conventional filter bag 14, the venturi 15, and the supporting cage 26, and comprises a hollow, perforate diffuser tube D. As shown, the diffuser tube D is of a size adapted for being received longitudinally within the tubular supporting cage 26. The diffuser tube D is preferably provided with an adapter sleeve 31 at the upper end thereof to assist in mounting the diffuser tube on the venturi 15 and within the tubular supporting cage 26. Preferably, tube D is also provided at the lower end thereof with a ringlike spacer or other suitable means, not shown, to assist in maintaining the diffuser tube D centered within the surrounding cage.

Preferably, the diameter of the diffuser tube D is as large as possible so as to maximize the cross-sectional area of the diffuser tube while still allowing sufficient clearance between the diffuser tube and the cage 26 to permit moving the diffuser tube into position within the cage and so that the diffuser tube will be substantially out of contact with the surrounding cage 26 and the filter bag 14. Typically, the outside diameter of the diffuser tube is about one to two inches less than the inside diameter of the surrounding cage.

The diffuser tube D may be formed of any suitable material capable of withstanding the conditions to which the filtering system is subjected. For example, in a filtering system which is subjected to high temperature effluent gases which may be of a corrosive nature, stainless steel is the preferred material. However, in other less severe applications other materials may be suitable.

As illustrated, the diffuser tube is of a circular cross section for being received within a surrounding supporting cage which is also of a circular cross section. However, the diffuser tube may be constructed of a different cross-sectional shape, such as oval for example, in order to fit within cages of other cross-sectional shapes.

In the present instance, the venturi 15 is of circular cross section, and therefore, the air diffuser tube D is circular in cross section with its open upper end and its adapter sleeve 31 positioned in surrounding overlapping relation to the lower end annular ridge portion 15f of the venturi 15. Retaining means is interposed between and fixedly interconnects the inner end portion of the venturi 15 and the overlapping upper end of the diffuser tube D. The retaining means includes a plurality of segmental-circular coupling members positioned around and matingly engaging the supporting surface of the venturi annular ridge portion 15f. In the illustrative embodiment two diametrically opposite and substantially semicircular coupling members 34 are provided (FIGS. 5 and 6) having radially inwardly facing grooves 34a therein with the upper wall of each groove 34a extending at an angle for being supportingly engaged by the inclined supporting surface of the ridge portion 15f of the venturi.

The radially outer portions of the coupling members 34 are sized so as to be slideably or loosely received in the adapter sleeve 31 within the upper end of the diffuser tube D, and the lower portion of adapter sleeve 31 is provided with an inturned flange or shoulder means 31a for receiving thereagainst one side of the radially outer portions of the coupling members 34. Means are provided for releasably securing the radially outer portions of the coupling members 34 in the air diffuser tube D. To this end, it will be observed in FIGS. 5 and 6 that adapter sleeve 31 projects outwardly beyond the upper end of diffuser tube D and has an annular rib-like projection thereon defining an inwardly facing annular groove 31b for receiving therein a snap ring 36. The snap ring 36 overlies the segmental coupling members 34 so the snap ring 36 may engage the coupling members for supportingly communicatively connecting the upper end of the air diffuser tube to the ridge portion 15f of venturi 15 in suspended relation thereto. The coupling members 34 preferably are formed to substantially seal the upper end of the diffuser tube D against the flow of air between the upper end of the tube D and the outer surface of the lower end of the venturi 15 and so that the reverse flow jets of cleaning air are distributed along the tube as the cleaning air flows through tube.

The diffuser tube D has perforations or openings 40 formed therein which serve for diffusing and distributing air throughout the filter bag when a periodic reverse flow of a jet of air is directed into the outlet end of the filter through the venturi 15 and into the diffuser tube D. In the illustrated embodiment the perforations 40 are located substantially throughout the longitudinal and circumferential extent of the diffuser tube. Preferably, the size and spacing of the perforations 40 are such that the diffuser tube has a void area of from about 35% to about 50%.

The perforated air diffuser tubes D are typically made of standard nominal size diameters, such as 4 inches or 5 inches, for example, depending on the design of the particular baghouse filtration system. However, for any given size diameter diffuser tube, it has been determined that the tubular venturi 15 would somewhat vary in overall design and size, depending on the manufacturer thereof, particularly at the lower end of the venturi where the diffuser tube is to be supported therefrom. These variances in the diameter of the lower end of the venturi are rather slight for a particular nominal size and may readily be accommodated in the instant invention by providing coupling members 34 with varying depth inwardly facing grooves 34a therein, with the outside diameter of the coupling members being unchanged. This variance in depth of the grooves is readily provided during molding of the coupling members by use of varying suitably dimensioned die and/or core components in the mold to thus avoid the necessity of a large number of relatively expensive molds for accommodating the small variances in the diameter of the lower end portion of tubular venturis at the point of supporting diffuser tubes therefrom.

It has been discovered in accordance with the present invention that one of the primary reasons for the ineffective cleaning of the conventional filter bag arrangement is that the pulse or blast of reverse purge air was concentrated in the area adjacent where it entered the interior of the filter, namely, adjacent the outlet end of the filter. The effect of the reverse purge was substantially dissipated at the far end of the filter from the air outlet. Thus, while the outlet end of the filter was being acted upon by the reverse purge of air, and in fact may have actually been overcleaned, the far end of the filter was essentially left uncleaned. As a result, the entire length of the filter bag was not being effectively utilized for filtration and the efficiency of the filter diminished accordingly. The hollow perforated diffuser tube D of the present invention performs the function of diffusing and distributing the pulse or blast of cleaning air over the entire filter bag to thus provide much more effective and efficient cleaning of the filter bag.

The concentration of the cleaning air pulse adjacent the outlet end of the filter bag under the prior conventional arrangement also resulted in excessive flexing of the filter bag in that area. The more even distribution of the cleaning air as a result of the provision of the diffuser tube avoids this overflexing of the filter bag and thereby contributes to an increased useful life of the bag.

Another factor which has heretofore contributed to the wear of the filter bag is the high velocity flow of air along the inside surfaces of the filter bag adjacent the outlet end of the filter. While the velocity of the air as it passes through the filter bag is relatively low, the air velocity interiorly of the filter bag adjacent the outlet end thereof is considerably higher because of the reduced cross-sectional flow area as compared to the overall surface area of the filter bag. This relatively high velocity air, together with the dust particles which pass through the filter bag and are entrained in the air, would normally flow across the interior surface of the filter bag and cause additional wear and abrasion in this area. The provision of the diffuser tube of the present invention inside the filter bag serves to separate or insulate the interior surface of the filter bag from this high velocity air, thereby further contributing to the increased life of the filter bag.

As shown in FIG. 2, it is apparent that the diffuser tube D is of a length somewhat less than the overall length of tubular cage 26 with the diffuser tube positioned intermediate the ends of cage 26, it being noted that the upper end of the diffuser tube D is spaced from the upper end of the cage 26 and filter bag 14 by the intervening length of the venturi 15. Opposite upper and lower ends of the diffuser tube D are open, with the tube D thus being open-ended. In this regard, it is to be noted that the upper end of the diffuser tube is open by virtue of its being in direct communication with the longitudinal passage defined by the tubular venturi, which in turn, is open to the filtered air plenum 13 above wall 11.

In order to achieve the benefits and advantages of the present invention, it has been determined that it is not necessary for the diffuser tube D to extend the full length of the surrounding cage, although it may if so desired. The diffuser tube D should preferably have a length of at least about half the overall length of the surrounding cage 26, and desirably about two-thirds to three-fourths the overall length of the cage. In practice, it has been determined that the most effective cleaning of the filter bag 14 is obtained utilizing a hollow air diffuser tube D having a length of about two-thirds of the overall length of the cage 26. However, it has been determined that lengths considerably less than these preferred lengths still provide very beneficial results as compared to the results obtained in accordance with the prior art arrangement where no diffuser tube is employed.

In the drawings and specification there has been set forth a preferred embodiment of the invention, and although specific terms are employed, they are used in a generic and descriptive sense only and not for purposes of limitation.

That which is claimed is:

1. In a filter apparatus of the type wherein a particulate-laden gas is directed through a filter bag for filtering and retaining the particulate material on the exterior of the bag, wherein the filter bag has an outlet end communicating with a tubular venturi extending into the filter bag for discharge of the filtered gas therethrough, and wherein the filter bag is cleaned by a periodic reverse flow of a jet of air into the venturi and into and through the filter bag, and further wherein the filter bag is supported by a tubular cage positioned within the filter bag, the combination therewith of a hollow open-ended air diffusing means having openings therein and being communicatively connected to, supported by and extending from said venturi within said tubular cage for receiving in said hollow means a reverse flowing jet of air via said venturi for diffusing and distributing the air throughout the filter bag when a periodic reverse flow of a jet of air is directed into the filter bag so as to more effectively clean the filter bag while also reducing excessive flexing of the filter bag and abrasive wear thereof to thereby provide a substantial increase in the efficiency of the filter apparatus and a significant increase in the life of the filter bag.

2. A filter apparatus according to claim 1 wherein said hollow air diffusing means within said tubular cage is of a length less than said tubular cage and is located intermediate the ends of and substantially out of contact with said cage and said filter bag.

3. A filter apparatus according to claim 1 or 2 wherein said hollow air diffusing means within said tubular cage has an overall length of at least about two-thirds of the overall length of the surrounding tubular cage.

4. A filter apparatus according to claim 1 or 2 including retaining means for communicatively and sealably connecting said hollow air diffusing means to said venturi.

5. A filter apparatus according to claim 1 wherein said hollow air diffusing means within said tubular cage is communicatively connected to said tubular venturi by virtue of one open end of said air diffusing means being in surrounding overlapping relation to an inner end portion of said venturi extending into said filter bag, and wherein retaining means is interposed between and fixedly interconnects said inner end portion of said venturi and said overlapping end of said hollow air diffusing means.

6. A filter apparatus according to claim 5 wherein said venturi inner end portion is of outwardly flared shape and said retaining means comprises at least two segmental coupling members collectively positioned around and matingly engaging said venturi flared inner end portion, and means releasably securing radially outer portions of said coupling members in said overlapping end of said hollow air diffusing means.

7. A filter apparatus according to claim 6 wherein said overlapping end of said air diffusing means includes shoulder means therein for receiving thereagainst one side of said radially outer portions of said coupling members, and wherein said means releasably securing said coupling members in said air diffusing means includes a snap ring seated in said air diffusing means and engaging the opposite side of said coupling members remote from said shoulder means.

8. In a filter apparatus of the type including a filtering chamber containing a plurality of filter bags having outlet ends communicating with respective tubular venturis extending into the filter bags, wherein a particulate-laden gas is directed into the filtering chamber and through the filter bags for discharge of the filtered gas through the venturis as the particulate material is retained on the exterior of the filter bags, and wherein the filter bags are cleaned by a periodic reverse flow of jets of air into the filter bags via the respective venturis, and further wherein each filter bag is supported by a tubular cage positioned within each filter bag, the combination therewith of a hollow open-ended and perforated air diffuser tube communicatively connected to, supported by and extending from each venturi within the respective tubular cage for receiving in each diffuser tube a reverse flowing jet of air via the respective venturi for diffusing and distributing air throughout the respective filter bag when a reverse flow of a jet of air is directed into the filter bag so as to more effectively clean the filter bag while also reducing excessive flexing of the filter bag and abrasive wear thereof to thereby provide a substantial increase in the efficiency of the filter apparatus and a significant increase in the life of each filter bag.

9. A filter apparatus according to claim 8 wherein said hollow air diffuser tube within said tubular cage is of a length less than said tubular cage and is located intermediate the ends of and substantially out of contact with said cage and said filter bag.

10. A filter apparatus according to claim 8 or 9 wherein said air diffuser tube within said tubular cage has an overall length of at least about two-thirds of the overall length of the surrounding tubular cage.

11. A filter apparatus according to claim 8 or 9 including retaining means for communicatively and sealably connecting said air diffuser tube to said venturi.

12. A filter apparatus according to claim 8 wherein said hollow air diffuser tube within said tubular cage is communicatively connected to said tubular venturi by virtue of one open end of said air diffuser tube being in surrounding overlapping relation to an inner end portion of said venturi extending into said filter bag, and wherein retaining means is interposed between and fixedly interconnects said inner end portion of said venturi and said overlapping end of said hollow air diffuser tube.

13. A filter apparatus according to claim 12 wherein said venturi inner end portion is of outwardly flared shape and said retaining means comprises a pair of substantially semicircular segmental coupling members positioned around and matingly engaging said venturi flared inner end portion, and means releasably securing radially outer portions of said coupling members in said overlapping end of said hollow air diffuser tube.

14. A filter apparatus according to claim 13 wherein said overlapping end of said air diffuser tube includes shoulder means therein for receiving thereagainst one side of said radially outer portions of said coupling members, and wherein said means releasably securing said coupling members in said air diffuser tube includes a snap ring seated in said air diffuser tube and engaging the opposite side of said coupling members remote from said shoulder means.

* * * * *